P. C. JACQUEROD.
MECHANICAL EYES.
APPLICATION FILED NOV. 14, 1916.
1,233,242.
Patented July 10, 1917.
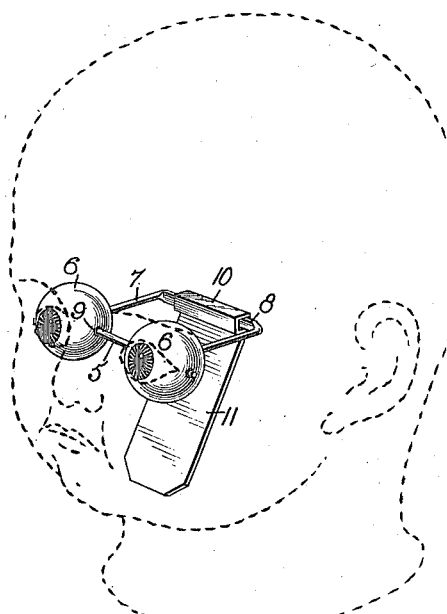
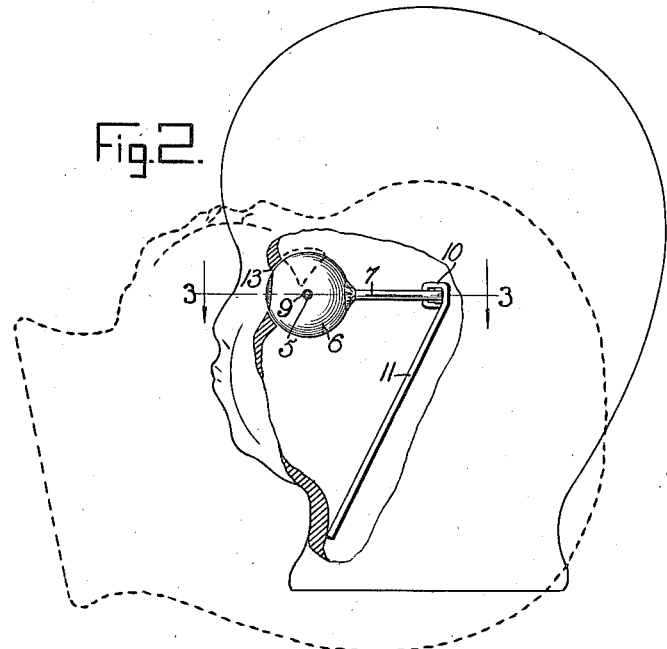
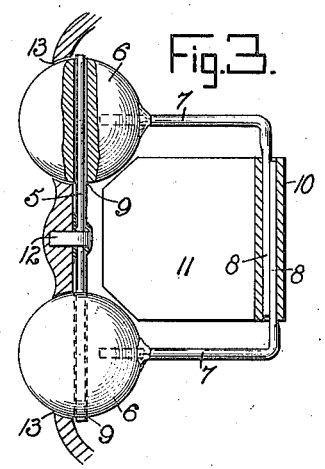
WITNESSES
INVENTOR
P. C. Jacquerod
BY
ATTORNEYS

UNITED STATES PATENT OFFICE.

PAUL CHARLES JACQUEROD, OF WEST NEW YORK, NEW JERSEY.

MECHANICAL EYES.

1,233,242.  Specification of Letters Patent.  Patented July 10, 1917.

Application filed November 14, 1916. Serial No. 131,267.

*To all whom it may concern:*

Be it known that I, PAUL CHARLES JACQUEROD, a citizen of the Republic of Switzerland, residing in West New York, in the county of Hudson and State of New Jersey, have invented certain new and useful Improvements in Mechanical Eyes, of which the following is a full, clear, and exact description.

My invention relates to mechanical eyes for toys and stuffed animals and is particularly adaptable for doll heads.

An object of the invention is to provide a structure in which the distance between the eyes may be varied so as to make the eyes adaptable for various toys in which the distance between the eye openings is variable.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a perspective view of the mechanical eyes shown as applied to a doll head, which head is shown in dotted lines;

Fig. 2 is a side elevation of a doll head partly broken out to show my mechanical eyes applied thereto, the dotted line showing the head in the horizontal position; and Fig. 3 is a horizontal section on line 3—3, Fig. 2.

In the manufacture of toys the mechanical eyes are manufactured in large quantities, the distance between the eye balls being previously predetermined and set, but the difficulty is that the distance between the eye openings in the toy, particularly in dolls, is not uniform. The variation may be slight but sufficient to necessitate an adjustment between the eye balls. If the arms supporting the eye balls are bent to vary the distance between the eye balls to make a proper register between the eye balls and the eye openings, the proper sight of the doll is destroyed, often appearing cross-eyed. This extra handling of the mechanical eyes to adjust them into the openings requires considerable time and labor, which increases the cost of manufacture, in addition not giving satisfactory results. Furthermore, for various sizes of toys it is necessary to make mechanical eyes in which the distance between the eye balls is greater or lesser.

To obviate the above defect and to eliminate the necessity of manufacturing mechanical eyes having different distances between the eye balls, I provide mechanical eyes the distance between which can be easily, quickly, and even automatically adjusted when setting the eye balls into the eye openings.

Referring to the drawings, 5 is the eyeball support in the shape of a round rod on which each eye ball 6 is free to revolve and slide. An arm 7 projects from the rear of each eye ball. The arm is secured rigidly to the ball so that any motion imparted to the arm is imparted to the ball. A portion 8 of each arm near the free end is bent at right angles to lie in a plane with the opening 9 of the eye ball and parallel thereto. The eye balls 6 are so mounted on the support 5 that the portions 8 of the arms 7 are directed toward each other, and the length of said portions 8 is such that they overlap when the eye balls are on the rod 5.

The overlapping portions 8 of the arms are preferably of angular cross section and engage a socket 10 of similar cross section. Said ends are free to slide in said socket but are prevented from turning. The socket 10 preferably forms an integral part of a weight arm 11 which serves as a pendulum for the eye balls 6.

The rod or support 5 is preferably secured between its ends when the mechanical eyes described are to be mounted in the toy. For that purpose anchoring means 12 are provided which are adapted to engage the toy between the eye openings 13, and the rod 5 between the ends thereof. This anchoring means 12 secures the rod positively to the toy.

The desired distance between the eye balls 6 is obtained by simply pulling or pressing on the arm 7 so as to displace the portions 8 within the socket 10. There is enough friction between the arm portions 8 and the socket so that a slight effort is required to cause a displacement of said arm portions in the socket. Furthermore, the socket 10 can be made of easily pliable material so that after the eyes are set it may be jammed and further displacement prevented. This setting as described may be done before or as the mechanical eyes are set into the toy. For example, the rod or support 5 carrying the eye balls with the weight arm are applied to the toy to be anchored, the eye balls will automatically enter into the openings, and if the distance is not exact the eye balls will slide on the rod and adjust themselves in the openings, causing a corresponding displacement of the arm portions 8 in the socket. After anchoring the rod or support, if desired the socket 10 may be jammed by pinching, but this is not necessary.

While I have described the principle of operation, together with the device which I now consider to be the best embodiment thereof, I desire to have it understood that the device shown is merely illustrative and that such changes may be made as are within the scope of the appended claims.

I claim:

1. In mechanical eyes, a support, eye balls on the support movable longitudinally thereof, and means for adjustably locking the eyes to one another so that the distance between the eyes on the support may be varied.

2. In mechanical eyes, a support, eye balls each revoluble and movable on the support longitudinally thereof, and means for adjustably locking the eyes to one another outside of the support to vary the distance between the eyes on said support.

3. In mechanical eyes, a support, eye balls revoluble on and movable longitudinally of the support, each of said eyes having an arm, and means for engaging said arms so that the eye balls are constrained to rotate together on said support, but the distance between the eyes on said support may be varied.

4. In mechanical eyes, a support, eye balls revoluble on and movable longitudinally of the support, an arm projecting rearwardly from each of the eye balls, said arms having overlapping portions disposed parallelly to the support, and a weight arm having a socket engaging said overlapping portions of the arms so that said portions are free to slide in said socket, whereby the distance between the eye balls on the support may be varied.

5. In mechanical eyes, a support, eye balls revoluble on and movable longitudinally of the support, an arm projecting rearwardly from each of the eye balls, said arms having overlapping portions of angular cross section, and a weight arm having a socket of angular cross section similar to the overlapping portions of the arms engaging said portions so that said portions are free to slide in the socket but constrained to rotate therewith.

PAUL CHARLES JACQUEROD.